United States Patent
Hao et al.

(10) Patent No.: US 10,698,910 B2
(45) Date of Patent: Jun. 30, 2020

(54) GENERATING COHORTS USING AUTOMATED WEIGHTING AND MULTI-LEVEL RANKING

(71) Applicant: ENTIT Software LLC, Sunnyvale, CA (US)

(72) Inventors: Ming C. Hao, Palo Alto, CA (US);
Nelson L. Chang, Palo Alto, CA (US);
Justin Aaron Scaggs, Plano, TX (US);
Felix Hamborg, Constance (DE);
Daniel Keim, Constance (DE)

(73) Assignee: MICRO FOCUS LLC, Santa Clara, CA (US)

( * ) Notice: Subject to any disclaimer, the term of this patent is extended or adjusted under 35 U.S.C. 154(b) by 263 days.

(21) Appl. No.: 15/766,655

(22) PCT Filed: Oct. 9, 2015

(86) PCT No.: PCT/US2015/054866
§ 371 (c)(1),
(2) Date: Apr. 6, 2018

(87) PCT Pub. No.: WO2017/062026
PCT Pub. Date: Apr. 13, 2017

(65) Prior Publication Data
US 2019/0065503 A1    Feb. 28, 2019

(51) Int. Cl.
*G06F 16/2457* (2019.01)
*G06F 21/55* (2013.01)
(Continued)

(52) U.S. Cl.
CPC .......... *G06F 16/24578* (2019.01); *G06F 7/16* (2013.01); *G06F 16/248* (2019.01); *G06F 21/554* (2013.01)

(58) Field of Classification Search
CPC .............. G06F 16/9535; G06F 16/248; G06F 16/24578
See application file for complete search history.

(56) References Cited

U.S. PATENT DOCUMENTS

| 8,386,401 B2 | 2/2013 | Virkar et al. |
| 2008/0071843 A1 | 3/2008 | Papadimitriou et al. |

(Continued)

OTHER PUBLICATIONS

Dominik Jackle et al., "Temporal MDS Plots for Analysis of Multivariate Data," IEEE Transactions on Visualization and Computer Graphics, vol. 22, No. 1, pp. 141-150, Aug. 12, 2015.
(Continued)

*Primary Examiner* — Etienne P Leroux

(57) ABSTRACT

Automated weighting is performed that includes transforming a behavior of each respective dimension of multiple dimensions of a selected group of events to a respective weight, the respective weight determined based on a distribution of values of the respective dimension, and where the weight determined for a first of the plurality of dimensions is greater than the weight determined for a second of the plurality of dimensions. Similarity values are computed indicating similarities between further events and the selected group of events, the similarity values based on a combination of the weights and distances between the further events and the selected group of events. Cohorts of the further events are generated by performing multi-level ranking that comprises ranking groups of the further events based on the similarity values, and applying merging to the groups to produce merged groups. The cohorts are visualized in a graphical visualization.

15 Claims, 5 Drawing Sheets

(51) Int. Cl.
    *G06F 16/248*    (2019.01)
    *G06F 7/16*      (2006.01)

(56) References Cited

U.S. PATENT DOCUMENTS

| | | |
|---|---|---|
| 2009/0106179 A1 | 4/2009 | Friedlander et al. |
| 2009/0234810 A1 | 9/2009 | Angell et al. |
| 2013/0024465 A1* | 1/2013 | Schiff .................. G06F 16/248 707/749 |
| 2014/0019443 A1* | 1/2014 | Golshan .............. G06F 16/9535 707/723 |
| 2014/0108380 A1 | 4/2014 | Gotz et al. |
| 2014/0122496 A1 | 5/2014 | Stivoric et al. |
| 2014/0358926 A1 | 12/2014 | McGregor et al. |
| 2015/0100897 A1 | 4/2015 | Sun et al. |

OTHER PUBLICATIONS

Hewlett-Packard Development Company, L.P., International Appl. No. PCT/US2015/021015 entitled Temporal-Based Visualized Identification of Cohorts of Data Points Produced From Weighted Distances and Density-Based Grouping filed Mar. 17, 2015 (32 pages).

Hewlett-Packard Development Company, L.P., International Appl. No. PCT/US2015/034906 entitled Generating Further Groups of Events Based on Similarity Values and Behavior Matching Using a Representation of Behavior filed Jun. 9, 2015 (29 pages).

ISA Search Report; PCT/US2015/054866; dated Jul. 7, 2016; 3 pages.

Parsons, L. et al.; "Subspace Clustering for High Dimensional Data: a Review"; Nov. 22, 2013; 16 pages.

Yan, J. et al.; "Cohort Modeling for Enhanced Personalized Search"; Jul. 6-11, 2014; 10 pages.

* cited by examiner

GENERATING COHORTS USING AUTOMATED WEIGHTING AND MULTI-LEVEL RANKING

BACKGROUND

A large amount of data (such as network traffic and so forth) can be produced or received in an environment such as a network environment that includes many machines (e.g. computers, storage devices, communication nodes, etc.), or other types of environments. As examples, data can be acquired by sensors or collected by applications. Other types of data can include security data, financial data, health-related data, sales data, human resources data, and so forth.

BRIEF DESCRIPTION OF THE DRAWINGS

Some implementations of the present disclosure are described with respect to the following figures.

DETAILED DESCRIPTION

Figure 1:
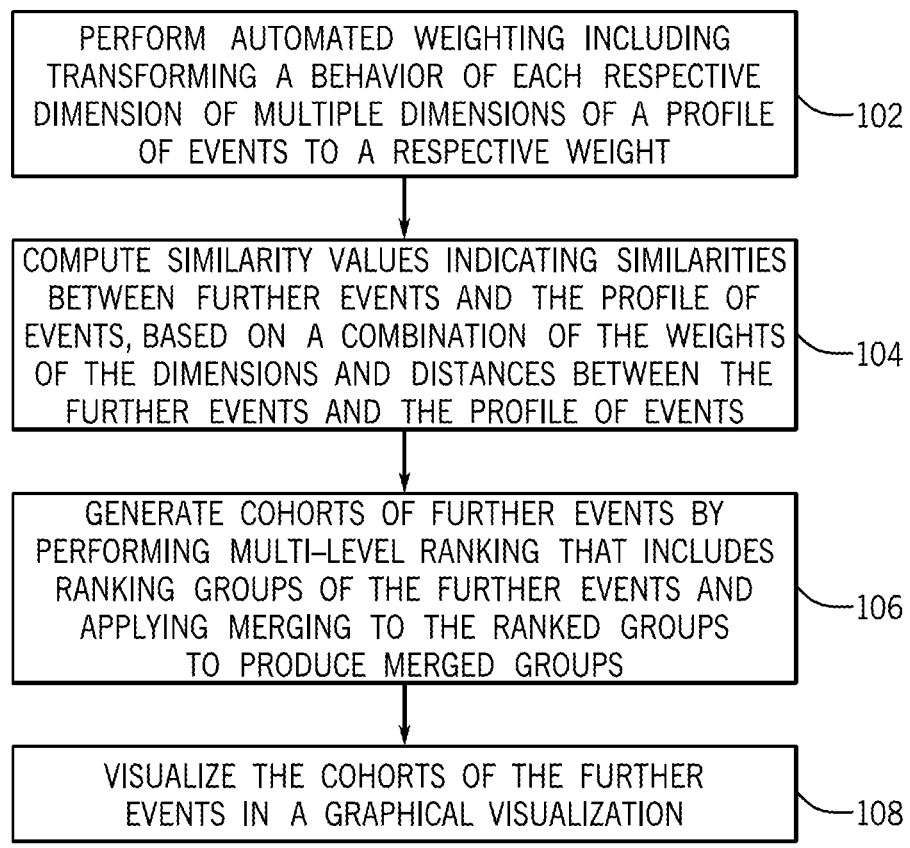
FIG. 1 is a flow diagram of an example process of generating and visualizing cohorts, according to some implementations.

Activity occurring within environment can give rise to events. An environment can include a collection of machines and/or program code, where the machines can include computers, storage devices, communication nodes, and so forth. Events that can occur within a network environment can include receipt of data packets that contain corresponding addresses and/or ports, monitored measurements of specific operations (such as metrics relating to usage of processing resources, storage resources, communication resources, and so forth), or other events. Although reference is made to activity of a network environment in some examples, it is noted that techniques or mechanisms according to the present disclosure can be applied to other types of events in other environments, where such events can relate to financial events, health-related events, human resources events, sales events, and so forth.

Generally, an event can be generated in response to occurrence of a respective activity. An event can be represented as a data point also referred to as a data record).

Each data point can include multiple dimensions (also referred to as attributes), where a dimension can refer to a feature or characteristic of an event represented by the data point. More specifically, each data point can include a respective collection of values for the multiple dimensions. In the context of a network environment, examples of dimensions of an event include a network address dimension (e.g. a source network address mid- or a destination network address), a network subnet dimension (e.g. an identifier of a subnet), a port dimension (e.g. source port number and or destination port number), and so forth. Data points that include a relatively large number of dimensions (dimensions) can be considered to be part of a high-dimensional data set.

Finding patterns (such as patterns relating to failure or fault, unauthorized access, network attacks, or other issues) in data points representing respective events can be difficult when there are a very large number of data points. For example, some patterns can indicate an attack on a network environment by hackers, or can indicate other security issues. Other patterns can indicate other issues that may have to be addressed.

As an example, to identify security attack patterns in a high-dimensional data set collected for a network environment, analysts can use scatter plots for identifying patterns associated with security attacks. A scatter plot includes graphical elements representing data points, where positions of the data points in the scatter plot depend on values of a first dissension corresponding to as x axis of the scatter plot, and values of a second dimension corresponding to a y axis. In some examples, the first dimension can be time, while the second dimension can include a value of a port (e.g., destination port) that is being accessed.

If ports are scanned (accessed) sequentially by security attacks, the security attacks can be manifested as a visible diagonal pattern in the scatter plot. If the ports are accessed in randomized order, however, the network traffic (i.e. port scan) may not be visible in the scatter plot.

In accordance with some implementations according to the present disclosure, techniques or mechanisms are provided to allow users to identify patterns associated with issues of interest to the users, such as occurrence of security attacks in a network environment, or other issues in other environments. These identified patterns are represented by "cohorts" of events, as described further below.

In some examples, a user can be presented with a graphical visualization including data points that represent respective events. Within the graphical visualization of the events, the user may see a pattern of interest, and can thus make an interactive selection of pixels (and more specifically, of a pattern of pixels) representing the data points associated with the pattern of interests. A "pixel" can refer to a graphical element (e.g. a dot a square or rectangle, a circle, etc.) that represents a respective data point. A "pattern of pixels" can refer to any collection of pixels that may be of interest to a user. The selected data points make up a selected group of events (also referred to as a "profile of events"). The profile of events can be stored and used later to find other patterns of events (also referred to as "groups of events") that are indicative of the same issue (e.g. network attack or other issue) represented by the profile of events.

In accordance with some implementations of the present disclosure, to avoid intermixed data in the identified groups of events (having a respective similarity to a profile of events), automated weighting and multi-level ranking can be applied. Performing automated weighting can refer to deriving weights for events without a user manually setting such weights. Intermixed data can refer to data of different values of a given dimension (referred to as a "constraint dimension") being included in an identified cohort of events. For example, a network attack can involve a port scan of a particular port number (in this example, the port dimension is the constraint dimension). Presence of intermixed data occurs if a particular identified group of events includes events relating to one or multiple other port numbers (in addition to the particular port number), which can cause anomalous patterns of events to be identified as being indicative of the port scan, even though such patterns of events are not associated with the port scan.

By removing intermixed data from groups of events, more meaningful groups of events can be identified using techniques according to some implementations. Such more meaningful groups of events can be referred to as "cohorts" of events, where a "cohort" of events can refer to a group of events identified based on application of automated weighting and multi-level ranking to remove intermixed data, according to some examples. The meaningful cohorts do not include intermixed data of the constraint dimension (which is also the dimension for winch a higher weight is assigned); in other words, for the constraint dimension, the cohorts would include just one value of the constraint dimension, in some examples. Application of weighting allows for dimensions of events to be weighted. In some implementations, the applied weighting increases the weight for a dimension that has a zero or low probability distribution (zero probability distribution means that there is just one outcome of the dimension expected, and low probability distribution means that there just a smaller number of outcomes expected).

Multi-level ranking allows for the identified cohorts of events is to be ranked, so that an analyst would be able to determine which of the cohorts are more meaningful (ranked higher) than other cohorts. The multi-ranking allows the identified cohorts to be more consistent with the profile of events. Weighting and multi-level ranking are discussed in further detail below. Although reference is made to events occurring in the context of network communications, it is noted that events can also include healthcare events, finance events, and other types of events in other contexts.

FIG. 1 is a flow diagram of an example process of finding meaningful cohorts in high-dimensional data, according to some implementations. The example process performs (at 102) automated weighting, which includes transforming a behavior of each respective dimension of multiple dimensions of a selected group of events (i.e. a profile of events) to a respective weight, where the respective weight is determined based on a distribution of values of the respective dimension, and where the weight determined for a first of the plurality of dimensions is greater than the weight determined for a second of the plurality of dimensions. A "weight" of a dimension can refer to a value associated with the dimension that determines the contribution of the dimension to deriving a similarity value, as discussed further below. As noted above, the events are represented by respective data points. A "behavior" of a dimension can refer to how values of the dimension differ across the events (e.g. a distribution of the values of the dimension across the events).

Each data point representing a respective event can include multiple dimensions. For example, a data point representing an event associated with data communications in a network can include the following dimensions (or attributes): source Internet Protocol (IP) address, source port number, destination IP address, destination port number, and so forth. For each given dimension, the different events of the selected group can have respective values of the given dimension. For example, if the given dimension is the source IP address, then the events of the selected group can have different values of the source IP address.

For the given dimension, a representation of behavior of a group of events (such as the profile of events) can include a respective diversity value that represents the distribution of values of the given dimension of the events of the profile of events. Generally, a diversity value provides an indication of the distribution of values of the given dimension (or of multiple dimensions). As an example, assume that there are N (N>1) events in the profile of events, and each data point representing a corresponding event of the profile of events has M dimensions (x1, . . . , xM). Then for each given dimension xj (j=1 to M), the N events have N respective values of xj. Note that at least some of the N values of xj can be different and/or at least some of the values of xj can be the same.

In some implementations of the present disclosure, a distribution of the values of xj in the profile of events can be determined, and this distribution of values of xj can be used to produce the corresponding diversity value in the representation of behavior of the selected group of events. A representation of behavior of the profile of events includes M diversity values, where each of the M diversity values represents the distribution of values of the dimension xj (j=1 to M).

In some examples, the diversity values in the representation of the behavior of the profile of events can include entropy values, where each entropy value is calculated for each respective dimension xj. The entropy value (or more specifically, a Shannon entropy value) can represent an expected value of information contained in each event. Entropy is zero when only a certain outcome is expected. As an example, for vertical network traffic (which can be an example of an attack against a network performed by a malicious entity in which a single IP address is scanned against multiple ports), the value of the destination IP address dimension stays the same across the events of the profile of events, while the values of the destination port number dimension vary across the events of the profile of events. Entropy characterizes uncertainty about a source (or sources) of information that give(s)s rise to the events; entropy increases for sources of greater randomness. In some examples, reference to "entropy" is the present discussion can be a reference to "normalized entropy," which can be entropy divided by information length.

In other examples, instead of using entropy values, the representation of the behavior of the profile of events can include diversity values computed using other probability distribution statistical techniques, where values in the representation of the behavior are derived from statistical distributions of the dimensions.

From the entropy values associated with respective dimensions of the profile of events, corresponding weights can be computed.

The example process of FIG. 1 further computes (at 104) similarity values indicating similarities between further events and the profile of events. The further events include events that are in addition to the events in the profile of events. The similarity values are computed based on a combination of the weights of the dimensions and distances between the further events and the profile of events.

The example process further generates (at 106) cohorts of the further events by performing multi-level ranking that includes ranking groups of the further events based on the similarity values, applying merging to the ranked groups to produce merged groups, to form the cohorts. As discussed further below, additional rankings can be performed in the multi-level ranking, as discussed below.

Next, the example process visualizes (at 108) the cohorts of the further events in a graphical visualization. A "graphical visualization" can refer to any viewable representation of information that can be displayed by a display device. More generally, the further groups can be visualised in a visualization such as in files or other entities.

FIGS. 2A-2D illustrate various example graphical visualizations. A graphical visualization 202 of FIG. 2A includes pixels representing data points in an input data set that is to be the subject of visual analysis according to some implementations. The graphical visualization 202 includes a horizontal axis representing dimension X (e.g. time or some other dimension), and a vertical axis representing dimension Y (e.g. port number or some other dimension). The graphical visualization 202 includes pixels assigned various colors depending upon values of another dimension Z (e.g. IP address or some other dimension) of the data points represented by the respective pixels. A color scale 204 includes various colors that are mapped to respective different values of the dimension Z.

Figure 2A:
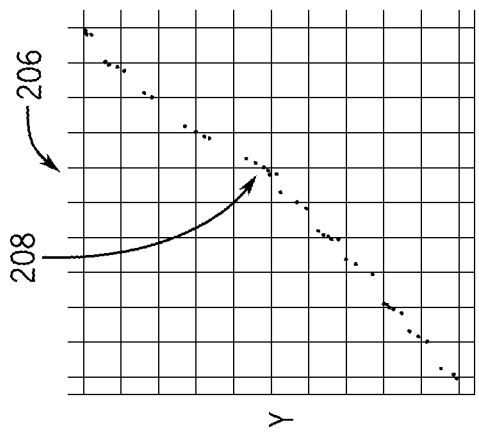
FIGS. 2A-2D illustrate example visualizations generated according to some implementations.
Figure 2C:
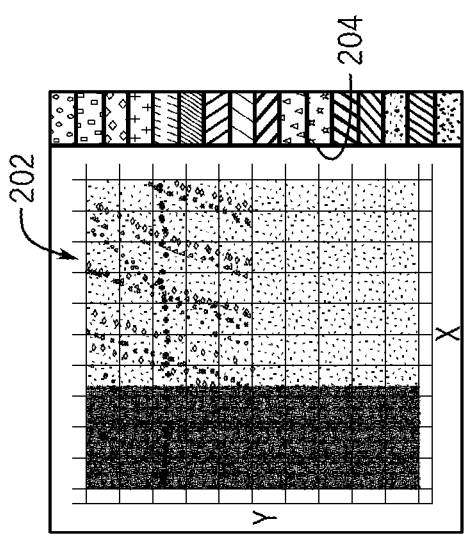
Figure 2B:
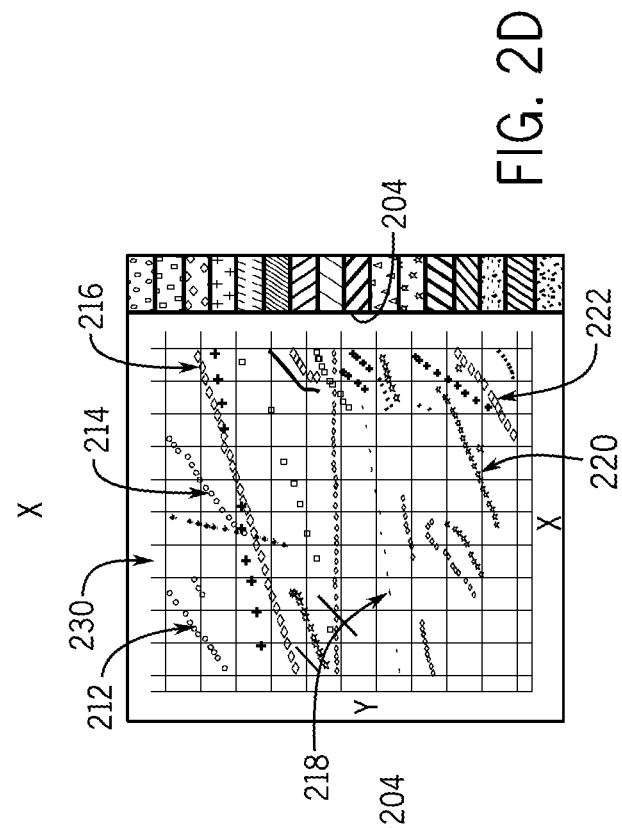

A graphical visualization 206 in FIG. 2B includes pixels representing data points of a group 208 that has been selected by a user as being interesting. The selection may have been made by the user using a cursor or other control element in the graphical visualization 202 of FIG. 2A. This is an example of an interactive user selection that can be made in a graphical visualization that includes a pattern of pixels representing respective events. This selected group 208 corresponds to a profile of events against which further cohorts of events are to be identified as discussed above.

FIG. 2C illustrates a graphical visualization 210 that has identified cohorts of events that are similar to the profile of events (corresponding to the selected group 208 of FIG. 2B), without using the automated weighting and multi-level ranking according to some implementations of the present disclosure. Examples of identified cohorts in the graphical visualization 210 include cohorts 214, 216, 218, 220, and 222 (among other cohorts not labeled in FIG. 2C). Each respective cohort of the cohorts 214, 216, 218, 220, and 222 includes a group of pixels corresponding to the events of the respective cohort. The identified cohorts of events include events represented by data points in the input data set represented in the graphical visualization 202 of FIG. 2A.

Because automated weighing and multi-level ranking was not used in producing the graphical visualization 210 of FIG. 2C, several diagonal lines 224, 226, and 228 are visible in the graphical visualization 210. Each diagonal hue 224, 226 or 228 represents intermixed data. For example, a user may wish to identify cohorts of events that present a port scan on a particular port number. The intermixed data presented by the diagonal lines 224, 226, and 228 can include events representing scans of other port numbers.

Figure 2D:
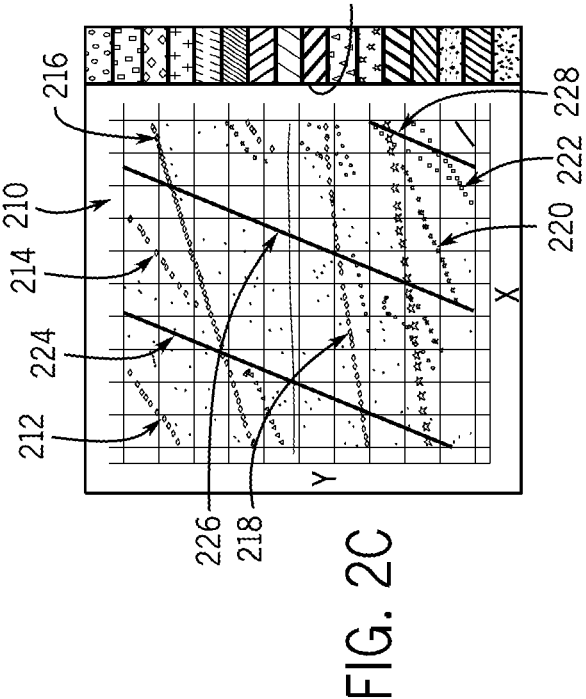

FIG. 2D shows graphical visualization 230 produced by applying a cohort identifying technique that applies the automated weighting and multi-level ranking according to some implementations. In the graphical visualization 230, the cohorts 212, 214, 216, 220, and 222 (among other cohorts) have been identified, but without the diagonal lines 224, 226, and 228 representing intermixed data.

FIGS. 2A-2D illustrate a first use case in which a profile of events are selected from the input data set represented by FIG. 2A. In another use case, in further examples, the profile of events does not have to be part of the input data set including events from which cohorts of events are to be identified that represent the same issue as a profile of events.

In some examples, a profile of events represents a pattern having a low probability distribution, in which at least one dimension of the profile of events has just one or a few expected outcomes. By using the automated weighting according to some implementations, the dimension(s) with low probability distribution is (are) weighted higher, and when combined with multi-ranking according to some implementations, ranked cohorts can be grouped together based on the distribution without intermixing data.

Figure 3:
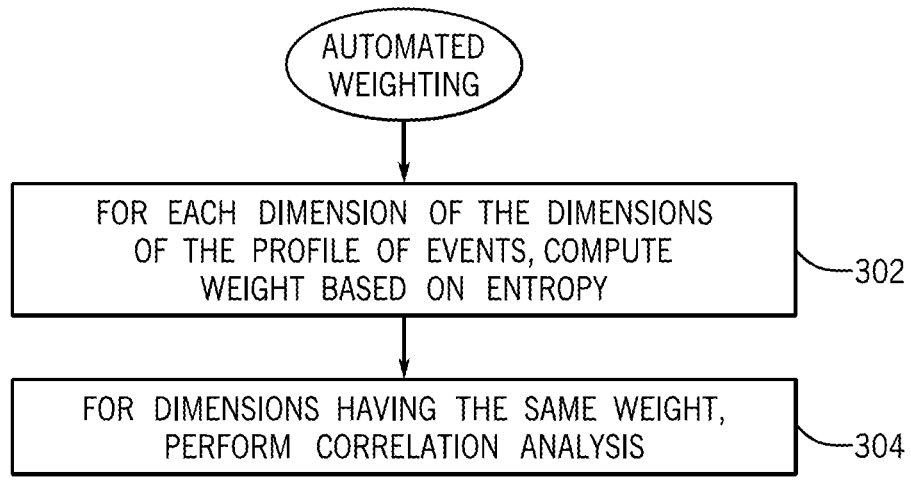
FIG. 3 is a flow diagram of an example process of automated weighting, according to some implementations.

FIG. 3 is a flow diagram of an example process of determining weights (as performed at 102 in FIG. 1, for example) for each dimension of multiple dimensions of data points corresponding to a profile of events.

For each dimension xj (j=1 to M) of the M dimensions of the profile of events, the weight of the dimension xj is computed (at 302) based on entropy as follows: weight(xj) =1−entropy(xj), where entropy(xj) represents the entropy computed for dimension xj.

In some examples, an entropy value for a given dimension can be computed according to Eq. 1 below:

$$\text{entropy}(C) = \frac{\sum_i p(c_i) \cdot \log(p(c_i))}{\sum_i c_i}. \quad \text{(Eq. 1)}$$

In Eq. 1, the entropy value is represented as entropy (C), where C is a frequency distribution, $c_i$ is the frequency of the i-th value of a given dimension, and $p(c_i)$ represents is the probability of $c_i$. Stated differently, $p(c_i)$ represents the relative frequency of $c_i$, where $c_i$ is a specific value out of all values in C. As a specific example, assume there are 1,000 values for a given dimension, and let $c_{20}$ of a specific value (e.g. "100.1.150.2") be 30 (i.e. the value "100.1.150.2" occurs 30 times for the given dimension). Then, in this example, $p(c_{20})$=30/1,000.

Moreover, $\Sigma_i p(c_i)$ represents a sum over all $p(c_i)$ values of a given dimension in the events of the selected group, and $\Sigma_i c_i$ represents a sum over all $c_i$ values of a given dimension in the events of the profile of events.

For dimensions that have the same weight, correlation analysis is performed (at 304) with the values of the dimensions. If there is a correlation between two or more dimensions, the weights of all dimensions except one are set to zero. Two or more dimensions are correlated if there is a specified degree of relationship between the dimensions. For example, dimension A and dimension B are correlated if an increase in value of dimension A tends to occur with an increase in value of dimension B, or if a decrease in value of dimension A tends to occur with a decrease in value of dimension B; this type of correlation is considered a positive correlation. Dimension A and dimension B are negatively correlated if an increase in value of dimension A tends to occur with a decrease in value of dimension B, or vice versa.

A correlation coefficient can measure a degree (or strength) of the relationship between two dimensions. For example, a Pearson Correlation Coefficient measures the strength of a linear relationship between two dimensions. When two dimensions are exactly (linearly) related, the correlation coefficient is either +1 or −1. Other values of the Pearson Correlation Coefficient can indicate lesser strengths of correlation.

The correlation analysis (at 304) identifies dimensions that are "highly" correlated, i.e. have a correlation that exceeds a specified threshold (e.g. the Pearson Correlation Coefficient>threshold). Such highly correlated dimensions do not have to be all considered. Note that the analysis of each dimension costs computation time and resource. If the number of dimensions is reduced, the overall process can be speeded up and made more efficient. By setting the weights of all highly correlated dimensions except one to zero, just the one dimension is later analyzed, rather than all the highly correlated dimensions. More generally, the correlation analysis can include determining correlation between dimensions and adjusting weights of the correlated dimensions, where the adjusting includes changing a value of a weight assigned to at least one of the correlated dimensions.

Figure 4:
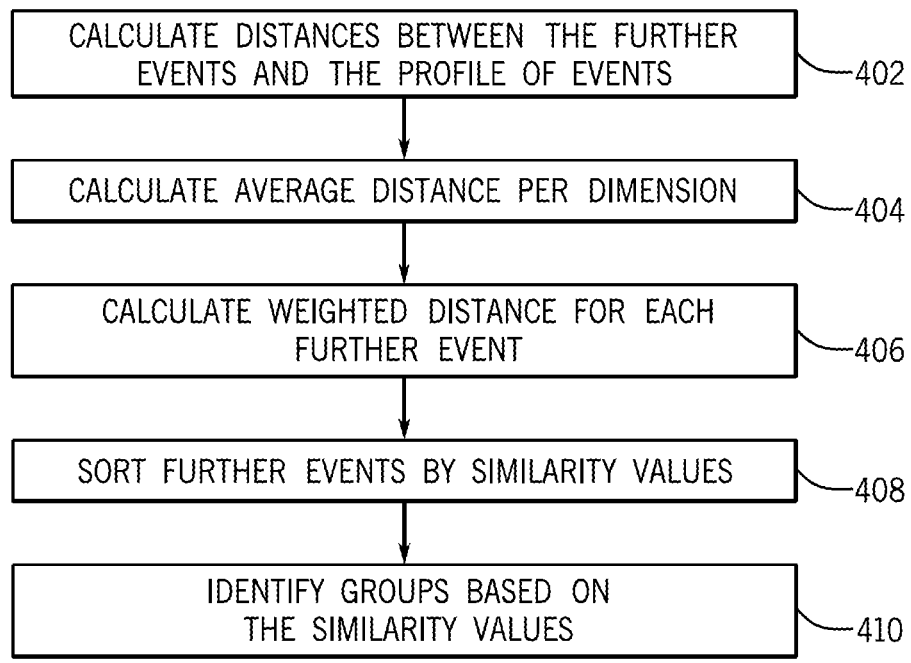
FIG. 4 is a flow diagram of an example process of calculating similarity values and identifying initial groups of further events, according to some implementations.

The weights produced by the process of FIG. 3 for respective dimensions can be provided in a weight vector of the weights. FIG. 4 is a flow diagram of an example process of computing similarity values (e.g. as performed at 104 in FIG. 1) between further events and the profile of events, using the weights of the weight vector as well as distances between the further events and the profile of events.

The process of FIG. 4 calculates (at 402) distances between the further events and the profile of events. As noted above, the similarity values computed at 104 in FIG. 1 are based on distances between the further events and the profile of events, and also based on the representation of behavior (e.g. as represented by the weight vector) of the profile of events.

The distance for dimension i between each data point $Px_i$ representing a further event and each data point $Py_i$ in the profile of events is calculated at 402. The distance can be computed in one of several different ways based on the type of dimension. If the dimension is a categorical dimension (a dimension that does not have numerical values, but rather, has values in different categories), then the distance is a categorical distance measure d(x, y), where d(x, y)=0 if x does not equal y, and d(x, y)=1 if x equals y. Such computation of the categorical distance measure is derived using a binary operation, where the distance measure is 0 if the dimensions are not equal, and 1 if the dimensions are equal. For other types of dimensions, other techniques for computing the distance can be used, such as based on a difference between values of x and y.

The average distance, $dm(i)(Px_i, Py_i)$, per dimension is then calculated (at 404) across each data point representing a further event and the data points representing the profile of events. A weighted distance, DISTANCE_WEIGHTED(Px, Py), for a data point Px representing a further event is then calculated (at 406) according to Eq. 2.

$$\text{DISTANCE\_WEIGHTED}(Px, Py) = \Sigma_i w_i \cdot dm(i)(Px_i, Py_i). \quad \text{(Eq. 2)}$$

In Eq. 2, $w_i$ is the weight for dimension as computed according to FIG. 2, for example. There is one weighted distance calculated for each data point representing a further event.

In some examples, the weighted distance, DISTANCE_WEIGHTED(Px, Py), can be normalized to a value between 0 and 1 by dividing the weighted distance by the sum of all weights $w_i$. In some examples, the normalized weighted distance can be used as the similarity value computed at 104 in FIG. 1. Alternatively, the non-normalized weighted distance can be used as the similarity value computed at 104.

The further events are sorted (at 408) by the similarity values (the normalized or non-normalized weighted distances). The sorted data points are thus arranged in order of their similarity values.

Using the sorted further events, groups of the further events can be identified (at 410) based on the similarity values. Effectively, the further events are divided into multiple groups based on the similarity values. A threshold t (which can be user-specified or specified by another entity) can be provided for identifying the groups. The threshold defines the maximum distance between further events within a particular group. In other words, the difference in similarity values between any two events within the particular group does not exceed t. Events that have similarity value differences greater than t are placed in separate groups. These groups are the "initial" groups of further events that are provided as inputs to multi-level ranking as discussed below.

In accordance with some implementations of the present disclosure, multi-level ranking of the groups can be performed, for the purpose of generating cohorts of the further events (e.g. task 106 in FIG. 1).

Multi-level ranking, which includes multiple levels of ranking, is discussed further below. The example pseudocode (lines 1-13) can be used for performing level 1 ranking, which is behavior/entropy based ranking.

---

LEVEL 1 RANKING: behavior/entropy based ranking

1  INPUT: profile of events with entropy values for analyzed dimensions,
2  groups of further events with entropy values for analyzed dimensions
3
4  for each current group of the groups of further events
5      group_entropy_distance = 0
6      for each dimension in analyzed dimensions
7          dimension_entropy_distance = entropy of that dimension in profile of events
8  MINUS entropy of that dimension in current group
9          dimension_entropy_distance = absolute value of diminsion_entropy_distance
10         group_entropy_distance = group_entropy_distance +
11 dimension_entropy_distance
12         save group_entropy_distance into group
13 sort groups by their subgroup entropy distances (from smallest to largest)

---

As indicated at lines 1 and 2 of the pseudocode, the inputs to the pseudocode include the profile of events (selected group of events as selected by the user, for example) and the groups of further events (more specifically the initial groups of further events produced by the FIG. 4 process, for example. In addition, entropy values for each dimension of the profile of events and the groups of further events are provided (such entropy values can be computed according to Eq. 1, for example).

Lines 4-12 of the pseudocode calculates the entropy distance of each group of further events to the profile of events based on entropy values for the various dimensions of the group of further events and the profile of events. As specified at lines 7-9 of the pseudocode, a dimension entropy distance (dimension_entropy_distance) for each respective dimension is equal to the absolute value of the difference between the entropy value of the respective dimension in the profile of events and the entropy value of the respective dimension in the group of further events. As specified at line 10 of the pseudocode, the dimension_entropy_distance for each respective dimension is summed with a group entropy distance (group_entropy_distance) for the current group.

As a result of lines 7-10 of the pseudocode, a group entropy distance is computed for each group of the groups of further events.

Line 13 of the pseudocode sorts the groups of further events by their group entropy distance values. The output of the level 1 ranking is the sorted groups of further events. In other examples instead of performing the level 1 ranking based on differences in entropy values between the groups of further events and the profile of events, the level 1 ranking can be based on differences of other types of diversity values between the groups of further events and the profile of events.

The following provides an example pseudocode (lines 14-17) for performing level 2 ranking, which includes re-ranking of the top K groups, where K≤R (R representing the number of the initial groups of further events).

| LEVEL 2: re-ranking of top K groups |
| --- |
| 14  INPUT: K |
| 15  for each current group of the top K groups of further events |
| 16      average over events the distance_to_profile (where distance_to_profile is the similarity value computed at 406 in Fig. 4) |
| 17  sort groups by average distance_to_profile |

The input (line 14) to the pseudocode for performing level 2 ranking is K, which causes selection of the top K groups of further events (as sorted by the level 1 ranking). At lines 15-16 of the pseudocode, the distance_to_profile values of the further events of the current group of further events are averaged (or otherwise aggregated), where the distance_to_profile values are the similarity values computed at in FIG. 4. An average distance_to_profile value is computed for each group of the top K groups of further events. The top K groups of further events are then sorted by the average distance_to_profile values (line 17 of the pseudocode).

Once the top K groups of further events have been re-ranked by the level 2 ranking, merging of the top K groups is performed, which is referred to as level 3 ranking. An example pseudocode to perform the level 3 ranking is provided below.

| LEVEL 3: merging based on similar distance_to_profile values |
| --- |
| 18  INPUT: second merge threshold |
| 19  for each current group of the sorted K groups of further events |
| 20      merge with another group if the average distance_to_profile of both groups is within |
| 21      the second merge threshold |

Level 3 ranking merges two groups of the sorted K groups based on similarity of the average distance_to_profile values of the two groups. The input (line 18) to the pseudocode is a "second merge threshold." This "second merge threshold" can be different (or the same as) the threshold used at task 410 of FIG. 4 for identifying the initial groups of further events. As indicated at lines 19-20 of the pseudocode, if the average distance_to_profile values of two groups differs by less than or equal to the second merge threshold then the two groups are merged into one group.

After level 3 ranking is performed to merge groups, level 4 ranking is performed of the merged groups of further events. An example pseudocode (lines 22-25) for performing level 4 ranking is provided below.

Level 4 ranking includes performing dimension-based splitting.

| LEVEL 4: dimension based split |
| --- |
| 22  INPUT: constraint dimension |
| 23  for each event in all the merged groups of further events |
| 24      check value of constraint dimension and put the event in a corresponding new group |
| 25      (one group for each constraint dimension value possible) |

The input (line 22) to the pseudocode is a constraint dimension, which can be set by a user or another entity. As an example, a user knows that the resulting cohorts of further events of interest should contain only a single value for the constraint dimension, e.g. all the events in the cohort of further events should share the same value of the constraint dimension. The pseudocode at lines 23-25 ensures that existing groups (the merged groups produced by the level 4 ranking) are split into more groups, if the constraint dimension(s) in a particular group of further events contains more than one value.

Next, level 5 ranking can performed on the resulting groups of further events produced by the level 4 ranking. The ranking can be similar the ranking performed in the level 2 ranking. The output of the level 5 ranking can be the output cohorts of further events, as generated at task 106 in FIG. 1.

Although 5 levels of ranking are part of the example multi-level ranking discussed above, it is noted that in other examples, the multi-level ranking can include less than or more than 5 levels of ranking of groups of further events.

Figure 5:
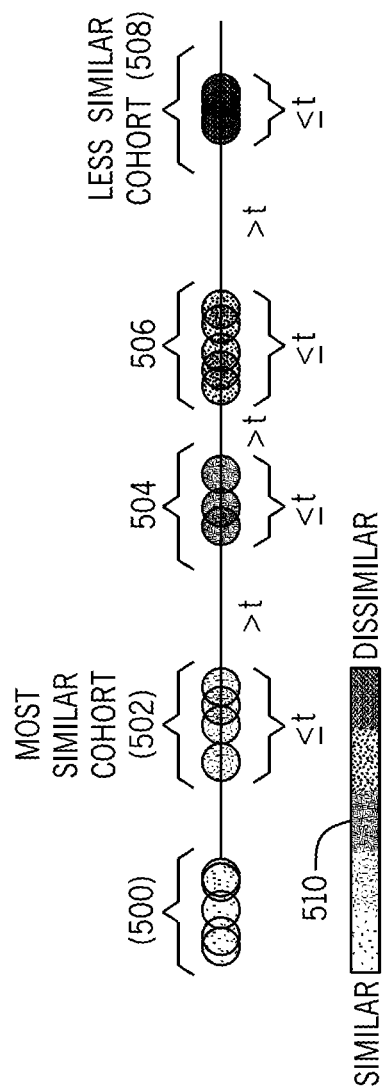
FIG. 5 illustrates an example graphical visualization including a profile of events and cohorts of events identified according to some implementations.

FIG. 5 shows an example graphical visualization including cohorts produced by the multi-level ranking according to some examples. The graphical visualization of FIG. 5 includes a profile of events (500) and four other cohorts 502, 504, 506, and 508, with cohort 502 being the most similar cohort to the profile of events, and cohort 508 being the least similar cohort to the profile of events.

FIG. 5 also shows that graphical elements (e.g. dots or circles) representing the events in the different cohorts are assigned different visual indicators (in the form of different fill patterns or colors, for example). The different visual indicators are represented in a scale 510, with cohorts that are more similar to the profile of events 500 having a fill pattern, (or color) to the left of the scale 510, and cohorts that are less similar to the profile of events 500 having a fill pattern (or color) to the right of the scale 510. The dots representing the events within a particular cohort are all assigned the same visual indicator (same fill pattern or same color). This allows a user to more easily detect which cohort an event is part of, and whether the event is similar or dissimilar to the profile of events 500.

Figure 6:
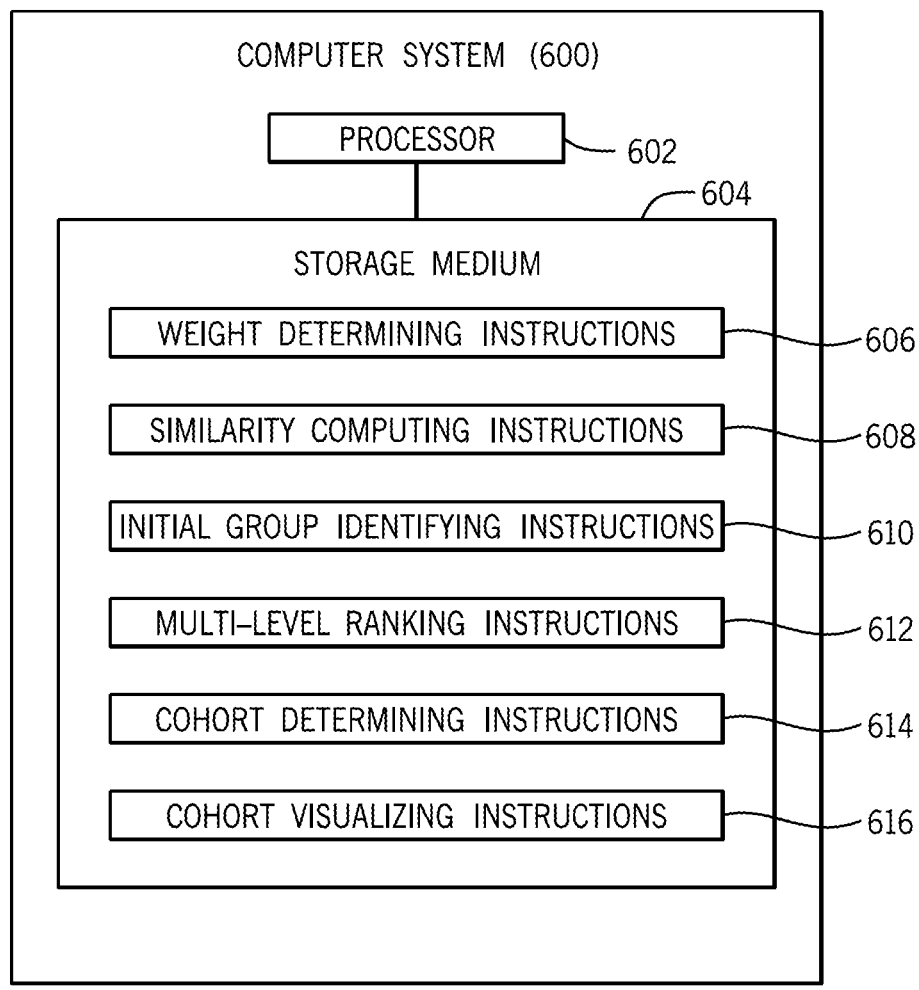
FIG. 6 is a block diagram of an example computer system according to some implementations.

FIG. 6 is a block diagram of an example computer system 600 according to some implementations. The computer system 600 can include one computer or a distributed arrangement of multiple computers (where different tasks of techniques according to some implementations can be executed in different computers of the distributed arrangement). The computer system 600 includes a processor (or multiple processors) 602. A processor can include a microprocessor, a microcontroller, a physical processor module or subsystem, a programmable integrated circuit, a programmable gate array, or a physical control or computing device.

The processor(s) 602 can be coupled to a non-transitory machine-readable or computer-readable storage medium (or storage media) 604, which can store various machine-readable instructions. The machine-readable instructions include weight determining instructions 606 to determine weights of respective dimensions of a profile of events (e.g. task 102 in FIG. 1). The machine-readable instructions include similarity computing instructions 609 to compute similarity values indicating similarities between further events and a profile of events (e.g. task 104 in FIG. 1 and task 406 in FIG. 4). The machine-readable instructions include initial group identifying instructions 610 to identify initial groups of the further events according to the similarity values (e.g. task 410 in FIG. 4) The machine-readable instructions include multi-level ranking instructions 612 to perform multi-level ranking (e.g. task 106 in FIG. 1 and the five levels of ranking discussed above). The machine-readable instructions include cohort determining instructions 614 to determine cohorts of the further events (e.g. task 106 in FIG. 1). The machine-readable instructions include cohort visualizing instructions 610 to visualize the cohorts in a graphical visualization (e.g. task 108 in FIG. 1).

The storage medium (or storage media) 604 can include one or multiple different forms of memory including semiconductor memory devices such as dynamic or static random access memories (DRAMs or SRAMs) erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    performing, by a system comprising a processor, automated weighting comprising transforming a behavior of each respective dimension of a plurality of dimensions of a selected group of events to a respective weight, the respective weight determined based on a distribution of values of the respective dimension, wherein the weight determined for a first of the plurality of dimensions is greater than the weight determined for a second of the plurality of dimensions;
    computing, by the system, similarity values indicating similarities between further events and the selected group of events the similarity values based on a combination of the weights and distances between the further events and the selected group of events;
    generating, by the system, cohorts of the further events by performing multi-level ranking that comprises ranking groups of the further events based on the similarity values, and applying merging to the groups to produce merged groups; and
    visualizing, by the system, the cohorts in a graphical visualization.

2. The method of claim 1, wherein the generating of the cohorts further comprises:
    re-ranking the merged groups to form the cohorts.

3. The method of claim 2, wherein the generating of the cohorts further comprises:
    splitting at least a first merged group of the merged groups based on the first merged group including more than one value of a constraint dimension, wherein the splitting produces split merged groups,
    wherein the re-ranking is applied to the split merged groups.

4. The method of claim 1, wherein the generating of the cohorts further comprises:
    selecting a subset of initial groups of the further events based on distance values between the initial groups of the further events and the selected group of events, the distance values based on differences between diversity values of dimensions of the initial groups of the further events and the selected group of events, wherein the ranking is applied to the groups of the further events in the subset.

5. The method of claim 1, wherein the merging comprises merging a first group of the further events and a second group of the further events in response to a first distance of the first group of the further events to the selected group of events being within a threshold of a second distance of the second group of the further events to the selected group of events.

6. The method of claim 1, further comprising:
    sorting the further events according to the similarity values; and
    identifying the groups of the further events using the sorted further events.

7. The method of claim 1, wherein the respective weight of each respective dimension of the plurality of dimensions is derived from a diversity value of the respective dimension.

8. The method of claim 1, wherein the respective weight of each respective dimension of the plurality of dimensions is derived from an entropy value of the respective dimension.

9. The method of claim 1, further comprising receiving an interactive user selection in a visualization of pixels representing events, the interactive user selection providing the selected group of events.

10. The method of claim 1, further comprising performing correlation analysis to determine a correlation between dimensions and to adjust the weights of correlated dimensions.

11. A system comprising:
    at least one processor; and
    a memory to store instructions executable on the at least one processor to:
        determine weights of respective dimensions of a profile of events, the weight determined for each respective dimension based on a distribution of values of the respective dimension, wherein the weight determined for a first of the dimensions is greater than the weight determined for a second of the dimensions;
        compute similarity values indicating similarities between further events and the profile of events, the similarity values based on a combination of the weights and distances between the further events and the profile of events;
        identify initial groups of the further events according to the similarity values;
        perform multi-level ranking comprising:
            ranking the initial groups of the further events based on diversity values of the initial groups of the further events;
            selecting a subset of the ranked initial groups of the further events, and re-ranking the groups of the further events in the selected subset based on the similarity values, and
            merging the re-ranked groups of the further events to produce merged groups of the further events;

determine cohorts of the further events based on the merged groups of the further events; and visualize the cohorts in a graphical visualization.

12. The system of claim 1, wherein the multi-level ranking further comprises:

splitting a first merged group of the merged groups of the further events based on the first merged group having more than one value of a constraint dimension, the splitting producing split merged groups of the further events.

13. The system of claim 12, wherein the multi-level ranking further comprises:

re-ranking the split merged groups of the further events according to the similarity values, wherein the cohorts are determined based on the re-ranked split merged groups of the further events.

14. The system of claim 11, wherein the weights are based on entropy values of the dimensions.

15. An article comprising at least one non-transitory machine-readable storage medium storing instructions that upon execution cause a system to:

receive a user selection to select a group of events;

perform automated weighting comprising transforming a behavior of each respective dimension of a plurality of dimensions of the selected group of events to a respective weight, the respective weight determined based on a distribution of values of the respective dimension, wherein the weight determined for a first of the plurality of dimensions is greater than the weight determined for a second of the plurality of dimensions;

compute similarity values indicating similarities between further events and the selected group of events, the similarity values based on a combination of the weights and distances between the further events and the selected group of events;

generating, by the system, cohorts of the further events by performing multi-level ranking that comprises ranking groups of the further events based on the similarity values, applying merging to the groups to produce merged groups, and splitting the merged groups; and visualize the cohorts in a graphical visualization.

* * * * *